(12) United States Patent
Jamet et al.

(10) Patent No.: US 6,937,802 B2
(45) Date of Patent: Aug. 30, 2005

(54) TELECOMMUNICATION CABLE INCLUDING OPTICAL FIBER MODULE

(75) Inventors: Patrick Jamet, Marolles sur Seine (FR); Nathalie Lecourtier, Villeblevin (FR); Daniel Bernier, Voulx (FR)

(73) Assignee: Sagem SA, Paris (FR)

( * ) Notice: Subject to any disclaimer, the term of this patent is extended or adjusted under 35 U.S.C. 154(b) by 168 days.

(21) Appl. No.: 10/344,664

(22) PCT Filed: Sep. 21, 2001

(86) PCT No.: PCT/FR01/02953

§ 371 (c)(1),
(2), (4) Date: Feb. 14, 2003

(87) PCT Pub. No.: WO02/31568

PCT Pub. Date: Apr. 18, 2002

(65) Prior Publication Data

US 2003/0168243 A1 Sep. 11, 2003

(30) Foreign Application Priority Data

Oct. 9, 2000 (FR) .......................... 00 12966

(51) Int. Cl.⁷ ............................... G02B 6/44
(52) U.S. Cl. ..................... 385/106; 385/112
(58) Field of Search ............... 385/106, 112, 385/109, 111, 115

(56) References Cited

U.S. PATENT DOCUMENTS

| 4,964,691 A | | 10/1990 | Nelson et al. | |
|---|---|---|---|---|
| 5,155,789 A | * | 10/1992 | Le Noane et al. | 385/106 |
| 5,345,526 A | * | 9/1994 | Blew | 385/112 |
| 5,649,043 A | * | 7/1997 | Adams et al. | 385/110 |
| 5,671,312 A | * | 9/1997 | Jamet | 385/100 |
| 5,703,984 A | * | 12/1997 | Carratt et al. | 385/106 |
| 5,739,473 A | * | 4/1998 | Zerbs | 174/121 A |
| 5,821,466 A | * | 10/1998 | Clark et al. | 174/113 R |
| 5,982,965 A | * | 11/1999 | Cheron et al. | 385/100 |
| 6,321,013 B1 | * | 11/2001 | Hardwick et al. | 385/114 |
| 6,480,653 B1 | * | 11/2002 | Hulin et al. | 385/106 |

FOREIGN PATENT DOCUMENTS

| DE | 32 00760 A1 | 7/1983 |
|---|---|---|
| EP | 0 468 878 A1 | 7/1991 |
| EP | 0 884 616 A2 | 12/1998 |

* cited by examiner

Primary Examiner—Michael G. Lee
Assistant Examiner—Kimberly D. Nguyen
(74) Attorney, Agent, or Firm—Lowe Hauptman Gilman & Berner, LLP

(57) ABSTRACT

A telecommunication cable includes a plurality of modules, each with a thin retaining sheath for clamping optical fibers together. Each retaining sheath contains plural respective modules and is mechanically coupled to the retaining sheaths of the respective modules to form supermodules that contact an outside jacket. The retaining sheath of a supermodule includes an identification color or line to distinguish the supermodules from each other.

14 Claims, 2 Drawing Sheets

TELECOMMUNICATION CABLE INCLUDING OPTICAL FIBER MODULE

REFERENCE TO RELATED APPLICATION

This application relies for priority on the PCT International Application No. PCT/FR01/02953, filed Sep. 21, 2001, which is based on the French Application No. 00-12966, filed Oct. 9, 2000.

BACKGROUND OF THE INVENTION

1. Field of the Invention

The present invention relates to a telecommunication cable including optical fiber modules. For example, the cable is a monomode fiber cable for transmitting high bit rate telephone and/or computer signals, in particular in a local area network or between telephone central offices or other switching or routing systems.

2. Description of the Prior Art

U.S. Pat. No. 5,155,789 discloses a telecommunication cable consisting of a plurality of optical fibers disposed in a jacket and divided into modules each enclosed in a thin retaining sheath that is easy to tear. The retaining sheaths hold the modules together and are in contact with the optical fibers to clamp them together without decoupling the optical fibers. The jacket, which may have an inner layer, which is preferably extruded, and a second layer which is outer and provides the finished presentation of the cable, is in contact with the module retaining sheaths to constitute a compact assembly.

The number of optical fibers in the above kind of cable can be very large, and can exceed a few hundred or even a few thousand. This high number of fibers gives rise to practical problems, especially when connecting the ends of the optical fibers in one cable to the ends of optical fibers in one or more other cables. The number of different colors used for the module retaining sheaths is typically limited to around twelve. Consequently, if the cable comprises a very large number of optical fibers divided into modules with from three to around twelve fibers per module, for example, the cable includes several modules of the same color. The low number of retaining sheath colors makes it difficult to identify the modules and to fan them out and assemble them into subassemblies respectively to be connected to other cables, and can lead to connection errors.

OBJECT OF THE INVENTION

The present invention aims to solve the practical problems referred to above and in particular to facilitate fanning out the optical fibers and identifying them in a telecommunication cable containing a very large number of sheathed optical fiber modules.

SUMMARY OF THE INVENTION

Accordingly, a telecommunication cable including a plurality of modules which each have a thin retaining sheath clamping optical fibers together, and a jacket around the modules is characterized in that it comprises retaining sheaths which each contain a plurality of respective modules and each of which is mechanically coupled to the retaining sheaths of the respective modules to form supermodules in contact with the jacket, and the retaining sheath of each supermodule includes identification means for distinguishing the supermodule from other supermodules in the cable.

By assembling the modules into supermodules identified by supermodule retaining sheaths different the one to the others, the groups of modules respectively contained in the supermodules can be fanned out separately. Because the number of supermodules in the cable, which is of the order of twelve, for example, is significantly lower than the number of modules, the supermodule identification means of the supermodules are different from each other. This prevents confusion between module retaining sheaths of the same color respectively included in supermodules.

BRIEF DESCRIPTION OF THE DRAWING

Other features and advantages of the present invention will become more clearly apparent on reading the following description of preferred embodiments of the invention, given with reference to the corresponding accompanying drawings, in which.

DETAILED DESCRIPTION OF THE DRAWING

Figure 1:
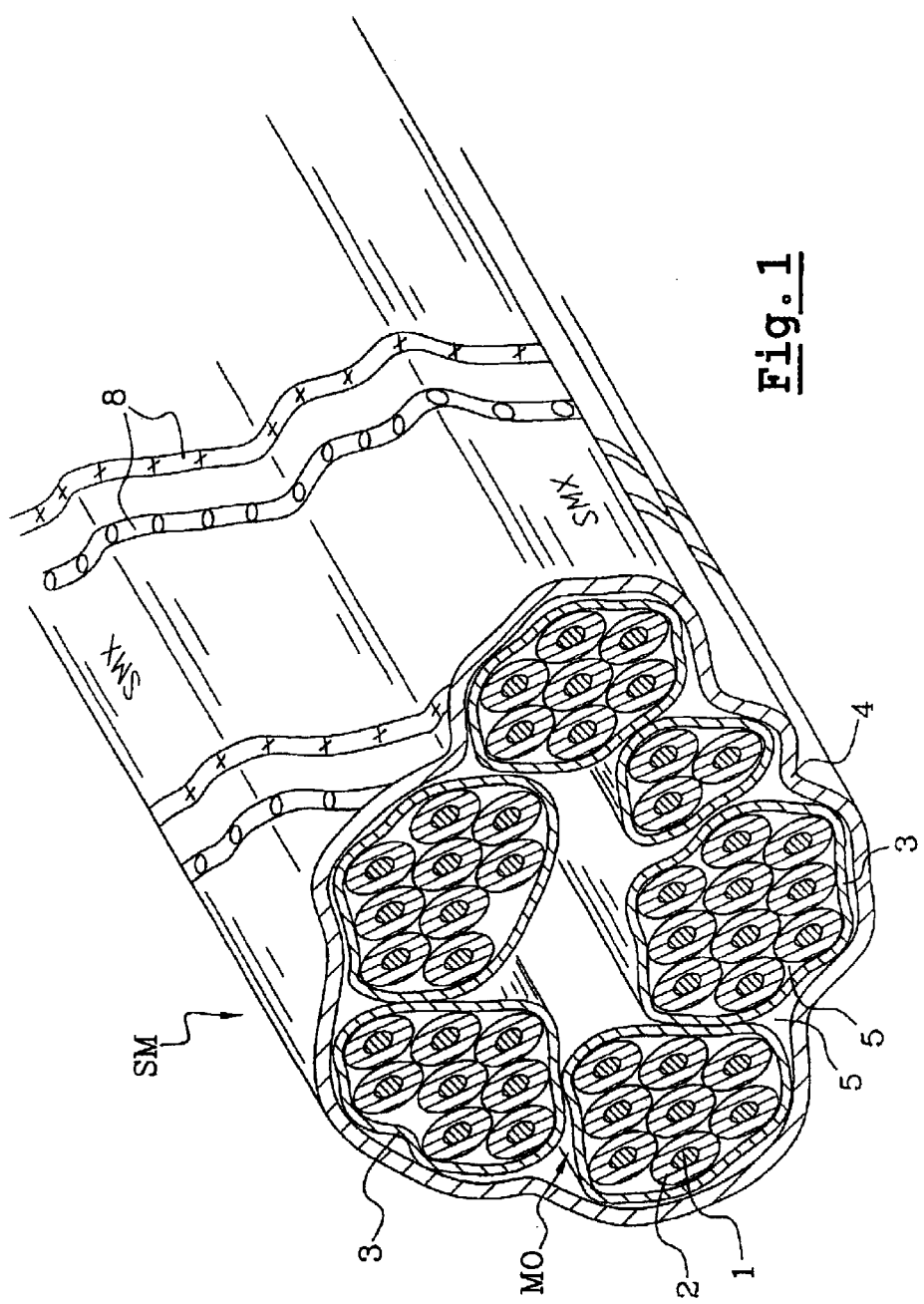
FIG. 1 is a highly enlarged diagrammatic perspective view of a supermodule conforming to the invention and containing six optical fiber modules.

As shown in FIG. 1, a supermodule SM included in a telecommunication cable according to the invention includes a plurality of optical fiber modules MO, for example six modules, and more generally at least two optical fiber modules MO. The relatively small number of modules MO in the supermodule SM enables the modules to be clearly distinguished from each other. For example, the retaining sheaths 3 of the modules in each supermodule are different colors.

In a manner that is known from U.S. Pat. No. 5,155,789, each module MO includes a plurality of optical fibers 1–2 each having a silica core 1 coated with a colored identification layer 2 and a thin retaining sheath 3 which is easy to tear and holds the fibers 1–2 together. The layers 2 of fibers in the module MO are different colors. The retaining sheath 3, called as "microgaine" ($\mu$Gaine (registered trade mark)), is in contact with the optical fibers and is mechanically coupled to the optical fibers to clamp them together. This coupling means that a traction force exerted on the retaining sheath 3 moves the optical fibers 1–2 contained in the sheath in translation at the same time and conversely that a traction force exerted on the fibers moves the retaining sheath in translation at the same time. The coupling ensures cohesion of the retaining sheath and the fibers that it contains and makes the module formed in this way highly compact.

As shown in FIG. 1, for example, a module MO comprises 3 to 12 optical fibers. The retaining sheaths 3 of the modules MO are adapted to the characteristics of the constituent materials of the optical fibers so that they clamp them and couple them so that expansion and contraction forces due to temperature variations are very much lower than stresses that could degrade the optical fibers. The fact that the retaining sheaths 3 are thin avoids subjecting the fibers 1 to tension and compression stresses during thermal cycling.

The supermodule SM also includes a retaining sheath 4 surrounding all of the respective modules MO contained in the supermodule to group them and hold them together. The sheath 4 is in contact with the retaining sheath 3 of each module MO and is mechanically coupled to the retaining sheaths 3 of the modules so as to clamp them. The thickness of the sheath 4 is at most about a few tenths of a millimeter, typically from 0.1 mm to 0.5 mm.

Like the material of the retaining sheaths 3 of the modules MO, the material of the sheaths 4 of the supermodule SM is an amorphous thermoplastic material, for example polyvinyl chloride (PVC), or an elastomer; or a thermoplastic material, for example a polyethylene, a polypropylene, or a polyolefin, such as ethylene vinyl acetate (EVA), and possibly contains one or more of the following mineral fillers: chalk, kaolin, silica, talc, calcium carbonate, alumina hydrate or magnesium hydrate, titanium oxide. The material of the retaining sheath 4 of the supermodule SM is preferably installed by extrusion around the respective set of modules MO simultaneously with drawing and assembling the modules MO and simultaneously with drawing and assembling the optical fibers 1–2 in the modules MO, the assembly operations preferably applying a twist in periodically alternating directions.

A filler material 5 fills the interior of the retaining sheath 3 of each module MO between the optical fibers 1–2 contained in the module. The filler material 5 is a sealing product such as silicone or synthetic grease, oil or gel, with which the optical fibers are coated before they are passed through a die for extruding the retaining sheath 3 of the module. To enhance the lengthwise seal inside the cable, the filler material 5 fills all of the space between the modules MO and the retaining sheath 4 of the supermodule SM, the modules MO being coated with the material 5 as they pass through a die for extruding the sheath 4.

In other embodiments, the filler material 5 is produced "dry" by associating swelling powder and/or swelling filaments and/or swelling tapes that swell in the presence of water to form a stopper that prevents propagation of water between, on the one hand, the optical fibers 1–2 inside the retaining sheath 3 of each module MO and, on the other hand, between the modules MO inside the retaining sheath 4 of the supermodule SM.

Figure 2:
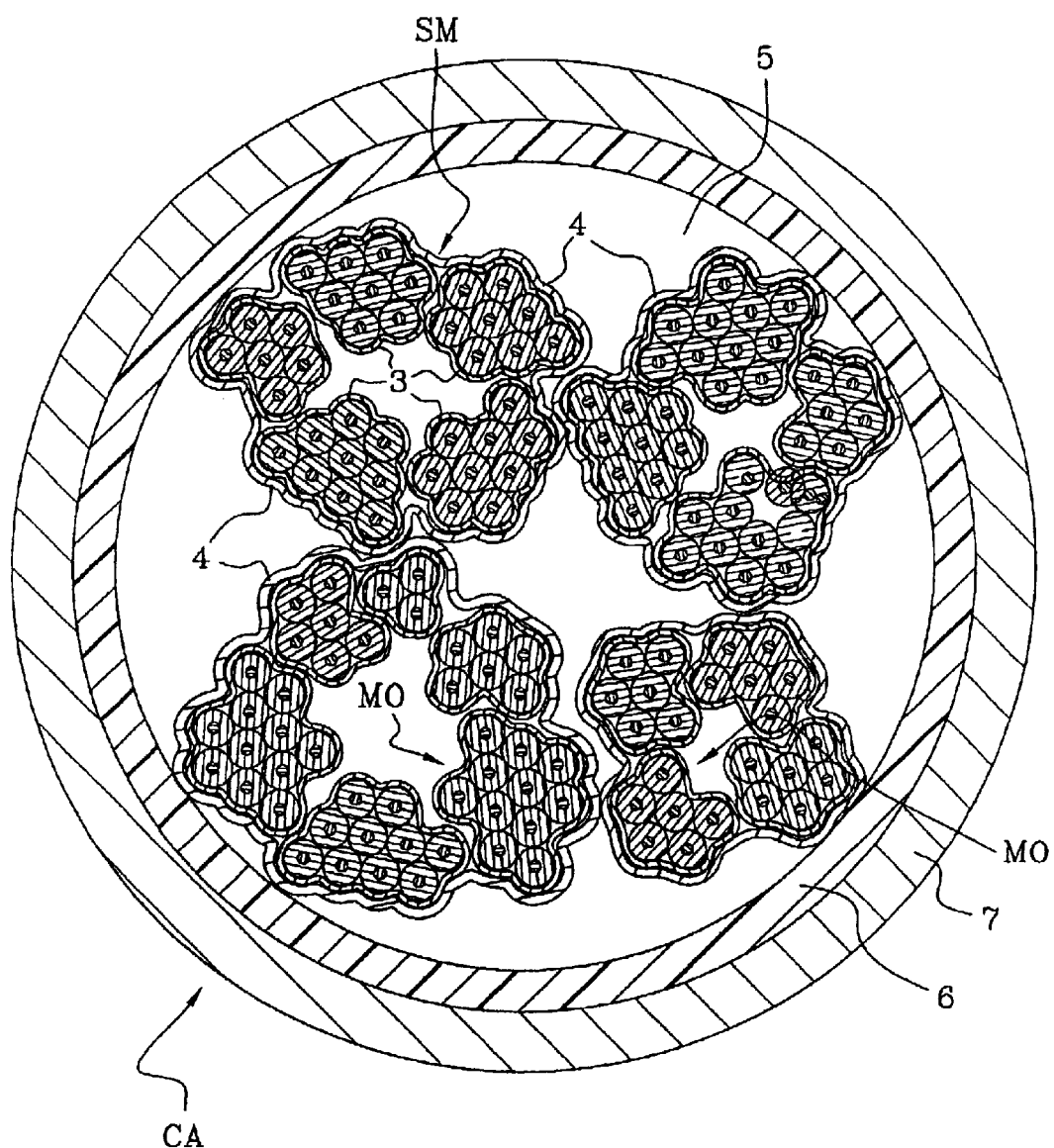
FIG. 2 is a highly enlarged sectional view of a cable containing four supermodules conforming to the invention.

Referring now to FIG. 2, a telecommunication cable CA according to the invention includes at least two supermodules SM, and more generally a plurality of supermodules SM, of which there are four in the example illustrated.

The supermodules SM are grouped together in an outer cable jacket 6–7 in contact with the retaining sheaths 4 of the supermodules to form a compact assembly. The outer jacket 6–7 is preferably made up of one or more extruded layers, at least one of which preferably includes buried or extruded mechanical reinforcements and/or tapes. In the example shown in FIG. 2, the outer jacket 6–7 has an inner layer 6 in contact with the retaining sheaths 4 of the supermodules SM, and an outer layer 7 thicker than the inner layer 6.

As in the supermodules SM and the modules MO, the filler material 5 preferably fills all of the space between the supermodules SM inside the cable jacket 6–7 to improve further the sealing of the cable.

The retaining sheath 4 of each supermodule SM includes respective identification means for identifying the supermodule and distinguishing it from the other supermodules contained in the cable CA, especially when fanning out the supermodules SM and the modules MO for connecting the ends of the fibers 1–2.

In a first embodiment, the retaining sheath 4, serving as identification means, includes a colored external identifying film coating from a few thousandths of a millimeter to a few tenths of a millimeter thick, like the retaining sheaths 3 for the optical fibers 1–2. As an alternative to this, the colored external film coating is replaced by integral coloring of the sheath 4. At least the outside faces of the sheaths 4 of the supermodules are then different colors.

In a second embodiment, which is shown in FIG. 1 and can be combined with the first embodiment, the supermodule identification means comprises one or more lines or strips 8 which are predetermined different colors from each other and in respect to the sheath 4. More generally, the colors of the lines 8 of each supermodule are different from the colors of the lines of the sheaths 4 of the other supermodules SM in the cable CA. The colored lines 8 extend longitudinally or helically along the sheath 4, and are either extruded simultaneously with the extruded sheath 4 or printed on the sheath 4, for example using indelible paint or ink. The lines 8 are narrow and can be significantly proud of the outside surface of the sheath 4.

In a third embodiment, also shown in FIG. 1, the identification means of the supermodule SM comprises a mark or sign made up of alphanumeric characters, such as SMX, in which X is the number of the supermodule, for example, which is marked on the sheath 4, preferably periodically and longitudinally and/or helically on the sheath. Like the line or lines 8, the mark SMX is preferably fluorescent so that it is more visible in low light.

In an analogous manner to the optical fibers 1–2 in the modules MO and the modules MO in the sheaths 4 of the supermodules SM, the retaining sheaths 4 are made simultaneously with drawing and assembling the SZ twisted modules MO. The supermodules SM are preferably extruded on an SZ extrusion line and are therefore twisted together with opposite and alternating twisting directions, i.e. having alternate sections with a forward helix pitch and then a retrograde helix pitch.

What is claimed is:

1. A telecommunication cable including:
   a plurality of modules, each having a thin retaining sheath for clamping optical fibers together;
   a plurality of supermodules, each having a thin retaining sheath that includes a plurality of respective modules, each supermodule retaining sheath being mechanically coupled to said retaining sheaths of said respective modules, said mechanical coupling of each supermodule retaining sheath to said respective module sheaths being as a result of an extrusion of said supermodule sheath around said modules;
   a jacket around and in contact with said retaining sheaths of said supermodules; and
   an identifier included respectively in said retaining sheaths of said supermodules for distinguishing each supermodule from the other supermodules in said cable.

2. A cable according to claim 1, wherein said retaining sheaths of the supermodules are made simultaneously with drawing and assembling of said modules.

3. A cable according to claim 1, wherein said supermodules are twisted in opposite and alternating twisting directions.

4. A cable according to claim 1, wherein said retaining sheath of each supermodule has a thickness of more than about a few tenths of millimeter.

5. A cable according to claim 1, wherein said retaining sheaths of said supermodules consist of the same material as said retaining sheaths of said modules.

6. A cable according to claim 1, wherein the material of said retaining sheaths of said supermodules is selected from the group consisting of an amorphous material, an elastomer and a thermoplastic material.

7. A cable according to claim 1, wherein said identifier included respectively in said retaining sheaths of said supermodules have colors different from one of the others.

8. A cable according to claim 1, wherein said identifier included respectively in said retaining sheaths of said supermodules have different colors from one of the others at least for outside faces of said retaining sheaths of said supermodules.

9. A cable according to claim 1, wherein said identifier included in said retaining sheath of each supermodule comprises at least colored lines having different colors from one of the others and in respect to said retaining sheath of said each supermodule.

10. A cable according to claim 1, wherein said identifier included in each supermodule comprises a mark marked periodically on said retaining sheath of said each supermodule.

11. A cable according to claim 1, wherein said retaining sheaths of said modules in each supermodule have different colors from one to the others.

12. A cable according to claim 1, wherein said jacket comprises at least an extruded layer.

13. A cable according to claim 12, wherein said extruded layer includes mechanical reinforcements.

14. A cable according to claim 1, comprising a sealing product filling at least a space between said retaining sheaths of said supermodules inside said jacket.

* * * * *